United States Patent
Choe et al.

(10) Patent No.: US 7,983,506 B2
(45) Date of Patent: Jul. 19, 2011

(54) METHOD, MEDIUM AND SYSTEM PROCESSING IMAGE SIGNALS

(75) Inventors: Won-hee Choe, Gyeongju-si (KR);
Chang-yeong Kim, Yongin-si (KR);
Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1007 days.

(21) Appl. No.: 11/889,623

(22) Filed: Aug. 15, 2007

(65) Prior Publication Data

US 2008/0056604 A1 Mar. 6, 2008

(30) Foreign Application Priority Data

Sep. 5, 2006 (KR) .................. 10-2006-0085289

(51) Int. Cl.
*G06K 9/40* (2006.01)
*G06T 5/00* (2006.01)
(52) U.S. Cl. ....................... 382/269; 358/3.27
(58) Field of Classification Search .............. 382/167, 382/254, 260, 263, 266, 268, 269, 272, 274, 382/275; 345/617, 649; 348/246; 358/3.27, 358/463, 518

See application file for complete search history.

(56) References Cited

U.S. PATENT DOCUMENTS

| | | | | |
|---|---|---|---|---|
| 5,812,702 | A * | 9/1998 | Kundu | 382/260 |
| 6,585,159 | B1 * | 7/2003 | Meier et al. | 235/462.31 |
| 6,756,992 | B2 | 6/2004 | Toji et al. | |
| 6,823,088 | B2 | 11/2004 | Kaneko et al. | |
| 6,901,170 | B1 * | 5/2005 | Terada et al. | 382/260 |
| 7,620,241 | B2 * | 11/2009 | Fan et al. | 382/167 |
| 2003/0214513 | A1 | 11/2003 | Brown et al. | |
| 2004/0080479 | A1 | 4/2004 | Credelle | |

FOREIGN PATENT DOCUMENTS

| | | |
|---|---|---|
| JP | 2004-280633 | 10/2004 |
| JP | 2005-260534 | 9/2005 |
| JP | 2005-332130 | 12/2005 |
| KR | 10-2005-0107284 | 11/2005 |

\* cited by examiner

*Primary Examiner* — Kanji Patel
(74) *Attorney, Agent, or Firm* — Staas & Halsey LLP

(57) ABSTRACT

A method, medium and system processing an image signal. The system includes an edge detection module to detect a pixel belonging to an edge in an input image, a period determination module to determine a period of change in pixel values based on a first value of the pixel belonging to the edge and a second value of a pixel that is adjacent to the pixel belonging to the edge, and a signal correction module to correct one or more sub-pixels of the pixel belonging to the edge using a weight allocated according to a result of the determination performed by the period determination module.

33 Claims, 16 Drawing Sheets

FALLING EDGE

RISING EDGE

FALLING EDGE

RISING EDGE

METHOD, MEDIUM AND SYSTEM PROCESSING IMAGE SIGNALS

CROSS-REFERENCE TO RELATED APPLICATIONS

This application claims priority from Korean Patent Application No. 10-2006-0085289 filed on Sep. 5, 2006 in the Korean Intellectual Property Office, the disclosure of which is incorporated herein by reference in its entirety.

BACKGROUND

1. Field

One or more embodiments of the present invention relate to a method, medium and system providing an image signal, and more particularly, to a method, medium and system reducing a color error band caused by a drastic brightness difference between sub-pixels by using a weight allocated according to the period of change in pixel values in an image display system such as a liquid crystal display (LCD), a plasma display panel (PDP), a light-emitting diode (LED), or an organic light emitting diode (OLED).

2. Description of the Related Art

In techniques of representing the relationship between colors, color spaces are used. Different image processing systems may use different color spaces for various reasons. Most image signal display apparatuses such as color cathode ray tube (CRT) monitors, liquid crystal display (LCD) monitors, and plasma display panel (PDP) monitors adopt a Red-Green-Blue (RGB) color space.

An RGB color space comprises red (R), green (G), and blue (B) which are three primary colors that can be added to one another. A plurality of spectral elements of each of R, G, and B are additively mixed, thereby generating other colors.

An RGB color model can be represented as a three-dimensional (3D) cube with the color black being located at the origin of the 3D cube, and white being opposite of black. For example, a 24-bit color graphic system providing eight bits for each color channel represent R as (255, 0, 0).

An RGB color model can facilitate the design of computer graphic systems, but is not suitable for every application because it depends too much on the relationship between R, G, and B. Various image processing techniques such as histogram smoothing are performed simply based on grayscale. Therefore, RGB images often need to be converted into grayscale images. According to the National Television Systems Committee standard, an RGB image can be converted into a grayscale image using Equation 1, for example.

$$Y = 0.288R + 0.587G + 0.114B \qquad \text{Equation 1}$$

Of R, G, and B, the color G affects grayscale the most. Thus, G grayscale can be used alone as grayscale data. Due to this characteristic, a G component is generally located at the center of each pixel in a sub-pixel-based display device. Therefore, a plurality of sub-pixels of each pixel may be arranged in the order of R, G, and B components or B, G, and R components.

The field of RGB sub-pixel-based image rendering techniques is largely divided into the field of resolution improvement techniques and the field of pixel error correction techniques. Examples of the resolution improvement techniques include an image display technique discussed in U.S. Pat. No. 6,823,088 to Mitsubishi Corporation that involves providing a pixel driving mode and a sub-pixel driving mode and generating image data with the use of a controller, and a resolution improvement filter technique discussed in U.S. Published Patent Application No. 2004-80479 to Clair Voyante Corporation, that involves the use of a resampling filter.

Examples of the pixel error correction techniques include a technique discussed in U.S. Pat. No. 6,756,992 to Mitsubishi Corporation that involves providing a font database, magnifying an image three times, and sub-sampling the magnified image, and a technique discussed in U.S. Published Patent Application No. 2003-214513 to Microsoft of removing jagging from text.

FIG. 1 is a diagram for explaining the displaying of alphabet letter 'A' using an RGB sub-pixel-type display device. Referring to FIG. 1, each pixel includes a plurality of R, G, and B sub-pixels 11. Each of the R, G, and B sub-pixels 11 of each pixel may have a value. The combination of the values of the R, G, and B sub-pixels 11 of each pixel can represent various colors. The R, G, and B sub-pixels 11 of each of a plurality of black pixels 12 that form alphabet letter 'A' may all have a value of 0. Since the R, G, and B sub-pixels 11 of each pixel occupy different spaces, they may fail to blend precisely. This problem with sub-pixel blending is apparent at the boundary between a pair of adjacent pixels, and particularly, when the size of pixels is too large. For example, left edges of alphabet letter "A" formed by the black pixels 12 may become bluish because of B sub-pixels 11 that adjoin the left sides of the black pixels 12.

FIG. 2 explains a color error band. Referring to FIG. 2, due to the properties of the human vision, color error bands 21 and 22 may be generated along the edges of an object in an image where the brightness of the image drastically changes. The color error bands 21 and 22 cause distortions in the intensity of an actual image signal. In general, the larger the size of the pixels, the clearer the color error bands 21 and 22 become.

SUMMARY

One or more embodiments of the present invention provide a method, medium and system reducing a color error band that may be generated in a sub-pixel-based image signal displaysystem, for example, due to an increase in the size of pixels or a drastic brightness difference between sub-pixels.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a method processing an image signal. The method includes detecting a pixel belonging to an edge in an input image, determining a period of change in pixel values based on a first value of the pixel belonging to the edge and a second value of a pixel that is adjacent to the pixel belonging to the edge, and correcting one or more sub-pixels of the pixel belonging to the edge using a weight allocated according to the determined period.

To achieve at least the above and/or other aspects and advantages, embodiments of the present invention include a system processing an image signal. The system includes an edge detection module to detect a pixel belonging to an edge in an input image, a period determination module to determine a period of change in pixel values based on a first value of the pixel belonging to the edge and a second value of a pixel that is adjacent to the pixel belonging to the edge, and a signal correction module to correct one or more sub-pixels of the pixel belonging to the edge using a weight allocated according to a result of the determination performed by the period determination module.

To achieve at least the above and/or other aspects and advantages, embodiments of the present invention include a method of processing an image. The method includes determining a period of change in pixel values based on a first value of a pixel belonging to an edge and a second value of a pixel adjacent to the pixel belonging to the edge in the image, and correcting one or more sub-pixels of the pixel belonging to the edge using a weight allocated based on the determined period.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
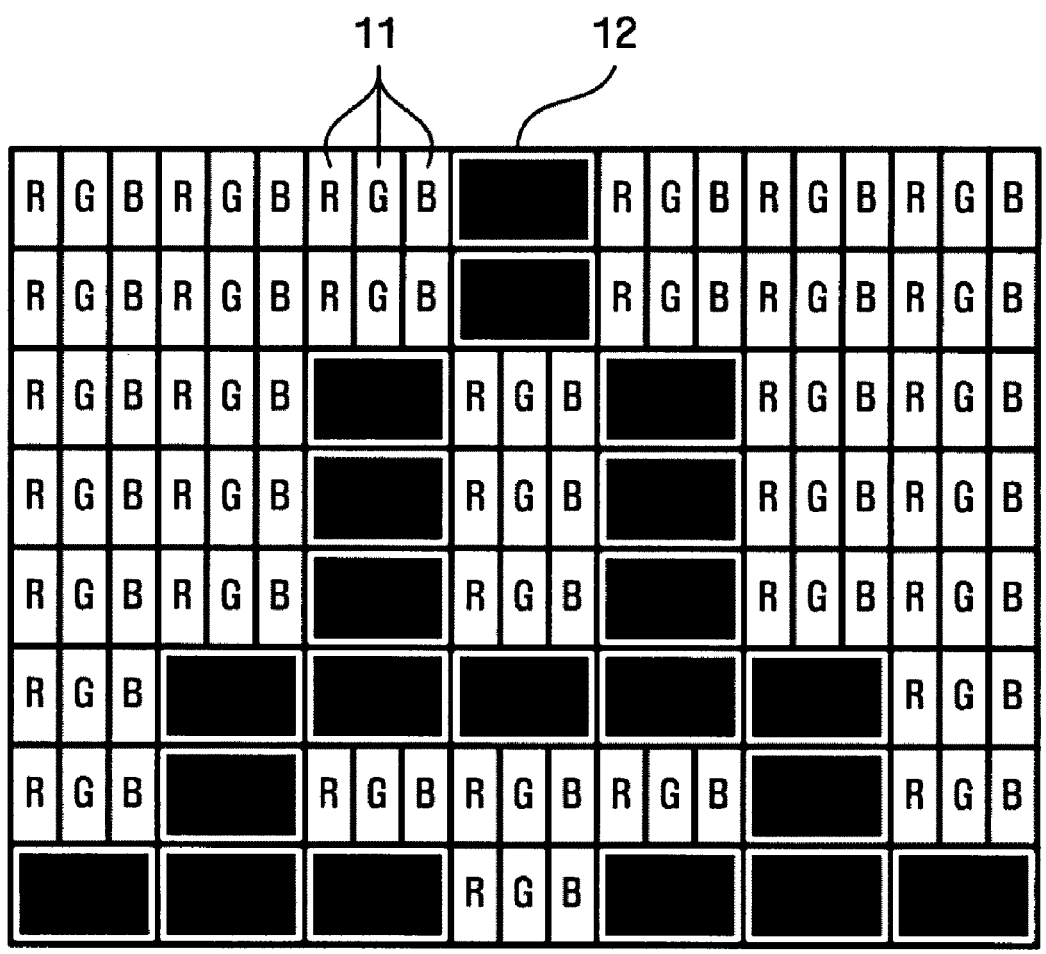
FIG. 1 illustrates the displaying of alphabet letter 'A' by a red-green-blue (RGB) sub-pixel-type display device.
Figure 2:
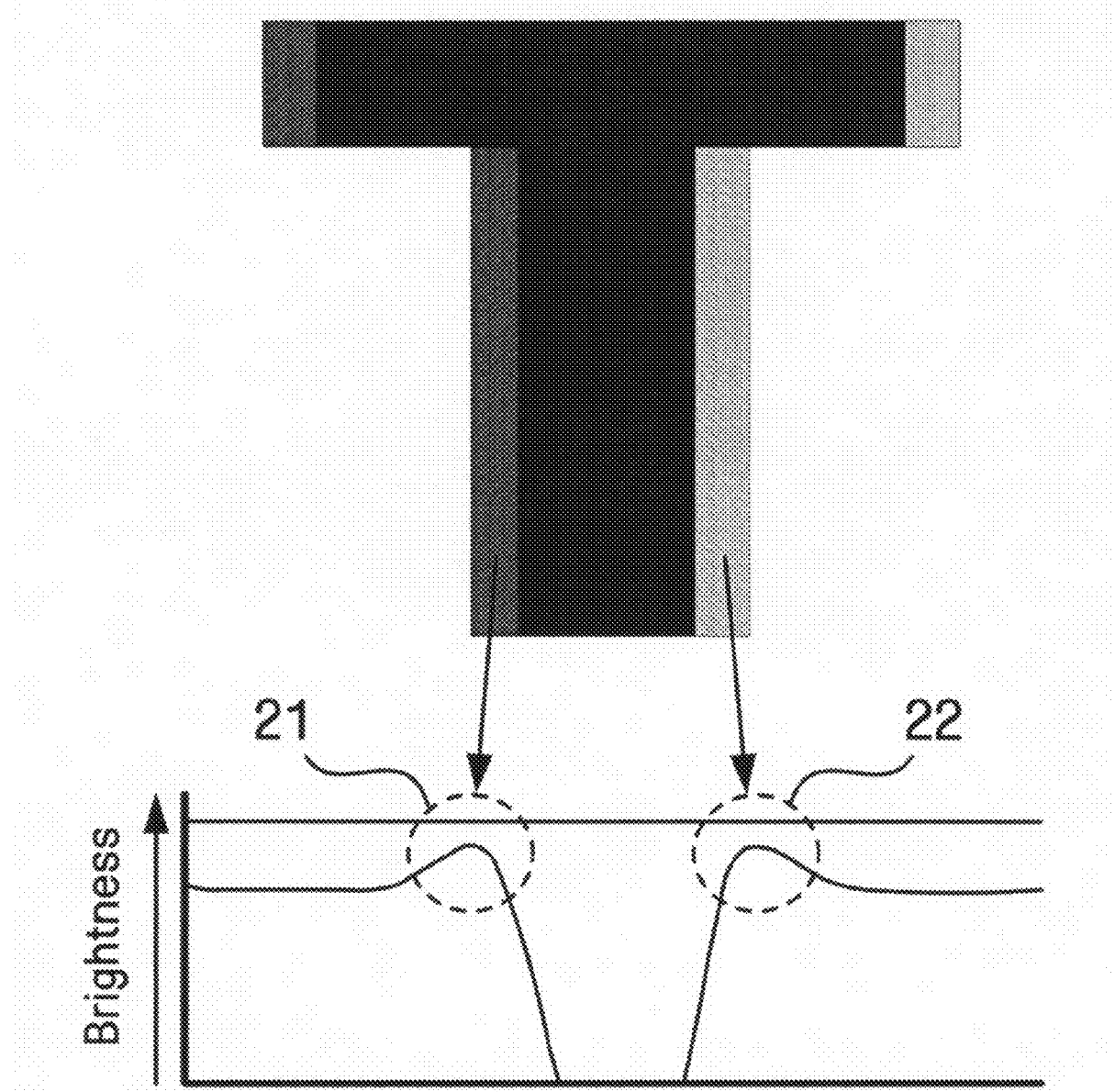
FIG. 2 explains a color error band.

Reference will now be made in detail to embodiments of the present invention, examples of which are illustrated in the accompanying drawings, wherein like reference numerals refer to the like elements throughout. Embodiments are described below to explain the present invention by referring to the figures.

One or more embodiments of the present invention relate to the reduction or removal of a color error band that may be generated along boundaries (or edges) in an image. One or more embodiments of the present invention may be applied to an image signal display system, for example, having a red (R)-green (G)-blue (B) or B-G-R sub-pixel geometry. In general, a horizontal R-G-B or B-G-R sub-pixel geometry may be used, but embodiments of the present invention need not be restricted to the same.

Figure 3:
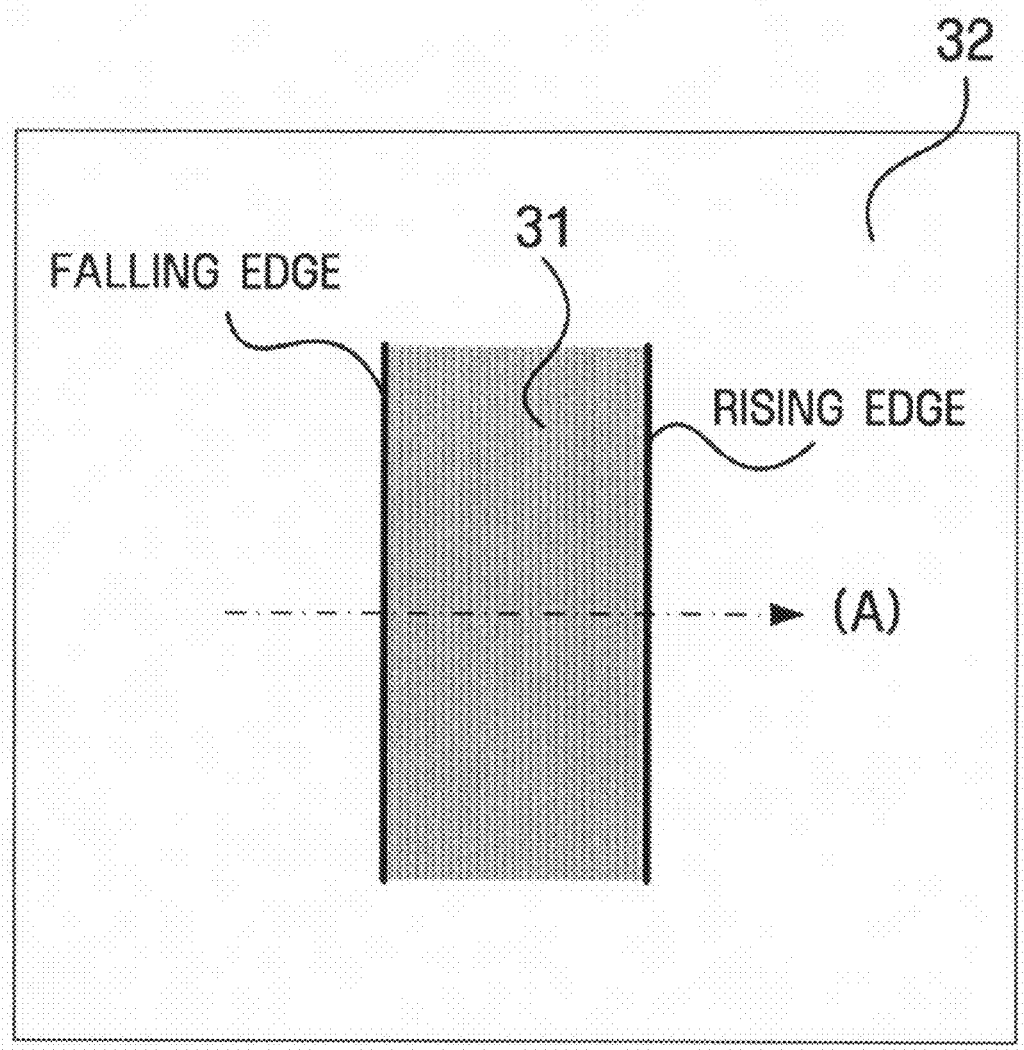
FIG. 3 explains left and right edges of an object rendered in an image when the object is darker than the background of the image.
Figure 4:
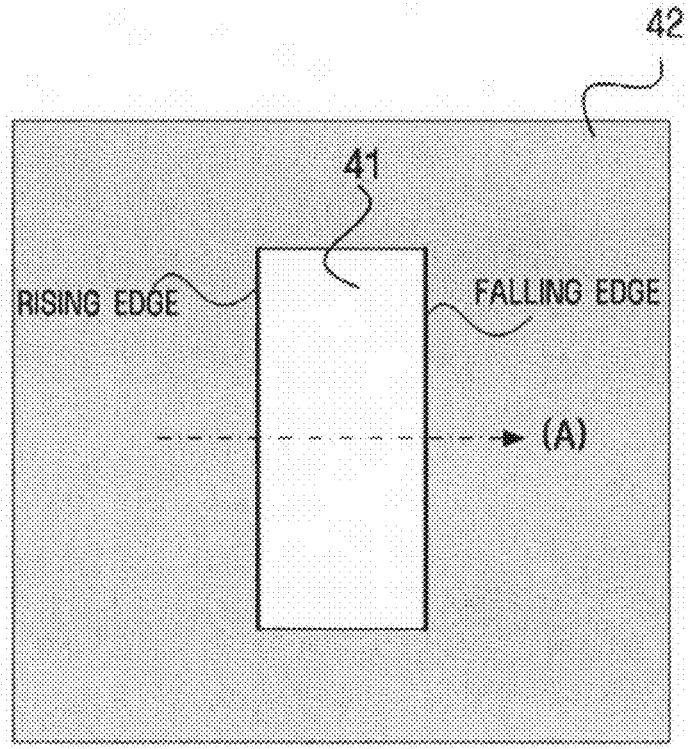
FIG. 4 explains left and right edges of an object rendered in an image when the object is brighter than the background of the image.

FIGS. 3 and 4 illustrate left and right edges of an object rendered in an image. Specifically, FIG. 3 illustrates the situation when an object is darker than a background 32, and FIG. 4 illustrates the situation when an object 41 rendered in an image is brighter than a background 42.

Referring to the variation of the brightness of pixels along a direction (A) illustrated in FIG. 3, the brightness of pixels may decrease at the left edge of the object 31, and may increase at the right edge of the object 31. Accordingly, the left edge of the object 31 may be considered a falling edge, and the right edge of the object 31 considered a rising edge.

Referring to the variation of the brightness of pixels in a direction (A) illustrated in FIG. 4, the brightness of pixels may increase at the right edge of the object 41, and the brightness of pixels may decrease at the left edge of the object 41. Accordingly, in contrast to FIG. 3, the left edge of the object 41 may be considered a rising edge, and the right edge of the object 41 considered a falling edge.

In the case of an image signal display system having a B-G-R sub-pixel geometry, R is likely to be identified with a falling edge, and cyan (C) is likely to be identified with a rising edge due to the nature of human vision.

Figure 5:
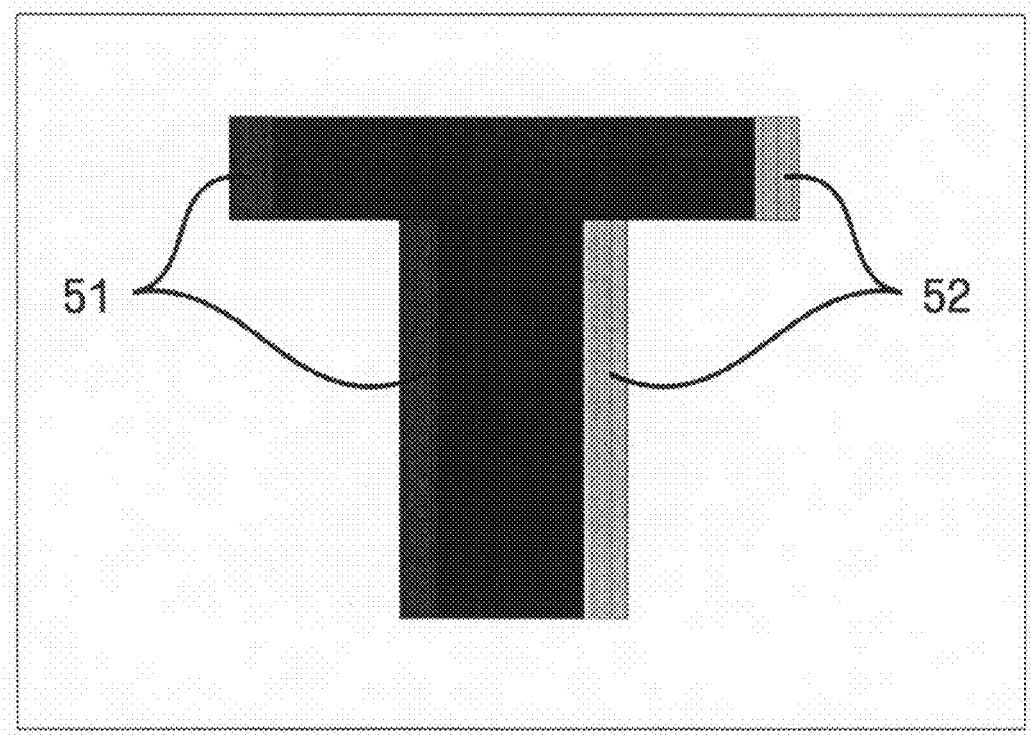
FIG. 5 illustrates a color error band that may be generated in the situation illustrated in FIG. 3.

Therefore, when an object rendered in an image is darker than the background of the image, as illustrated in FIG. 3, a color error band illustrated in FIG. 5 may be generated on a screen. In other words, referring to FIG. 5, a red error band 51 may be generated along left edges of an object in an image, whereas a cyan error band 52 may be generated along right edges of the object.

Figure 6:
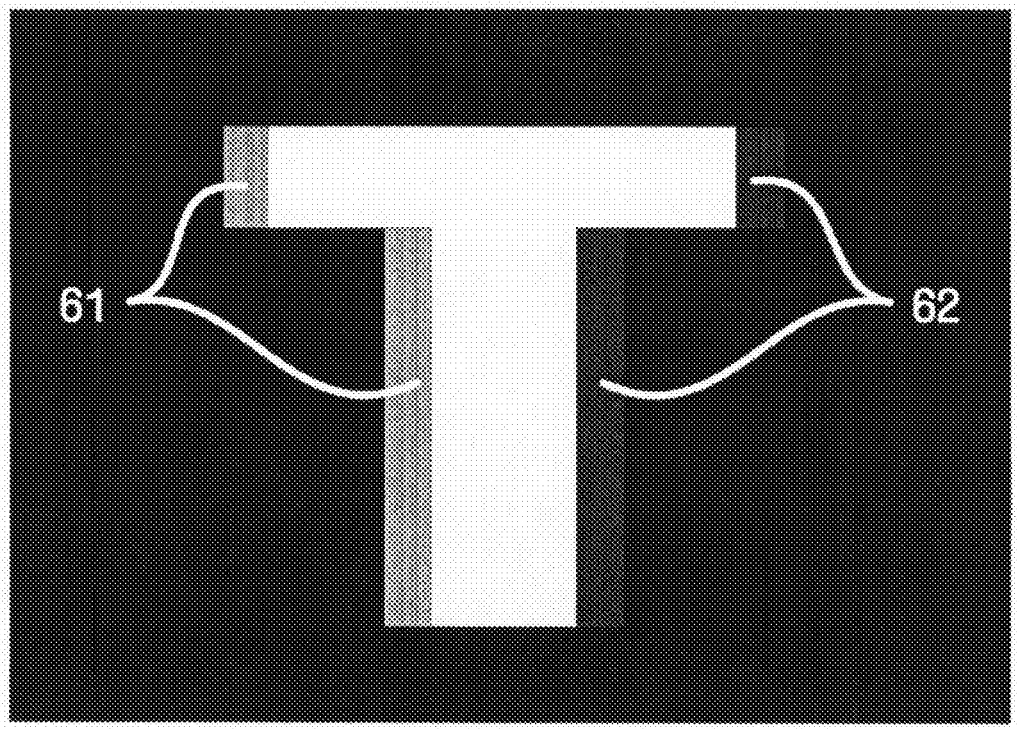
FIG. 6 illustrates a color error band that can be generated in the situation illustrated in FIG. 4.

On the other hand, when an object rendered in an image is brighter than the background of the image, as illustrated in FIG. 4, a color error band illustrated in FIG. 6 may be generated. In other words, referring to FIG. 6, a cyan error band 61 may be generated near left edges of an object in an image, whereas a red error band 62 may be generated near right edges of the object.

Figure 7:
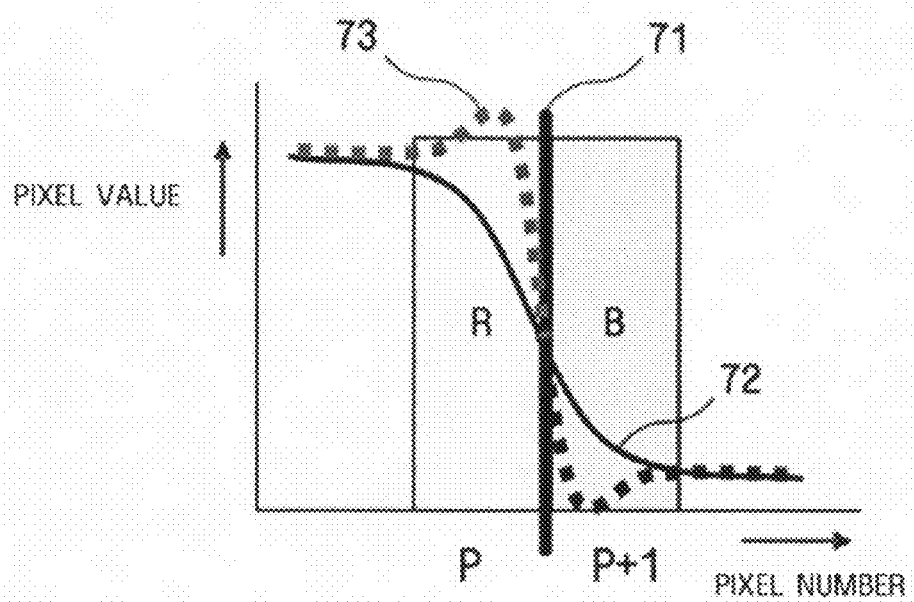
FIG. 7 compares input pixel data and output pixel data in the case of a falling edge.

FIG. 7 compares input pixel data and output pixel data in the case of a falling edge. Referring to a falling edge, such as illustrated in FIG. 7, the level of an input signal 72 may gradually decrease as a number of pixels increases, so the level of the input signal 72 for a P-th pixel on the left side of a pixel boundary 71 may be higher than the level of the input signal 72 for a (P+1)-th pixel on the right side of the pixel boundary 71. Referring to FIG. 7 for illustration purposes, the pixel number increases in the direction from left to right.

The pattern of signal variation that is actually displayed by an image signal display system in response to the input signal 72, i.e., the pattern of the variation of the actual observed output signal 73, may be slightly different from the original intended pattern of the variation of the input signal 72. Referring to the falling edge illustrated in FIG. 7, an R component of the output signal 73 may have a higher value than an R component of the input signal 72, and a B component of the output signal 73 may have a lower value than a B component of the input signal 72. This type of distortion may cause a color error band that may be perceived by human vision.

Figure 8:
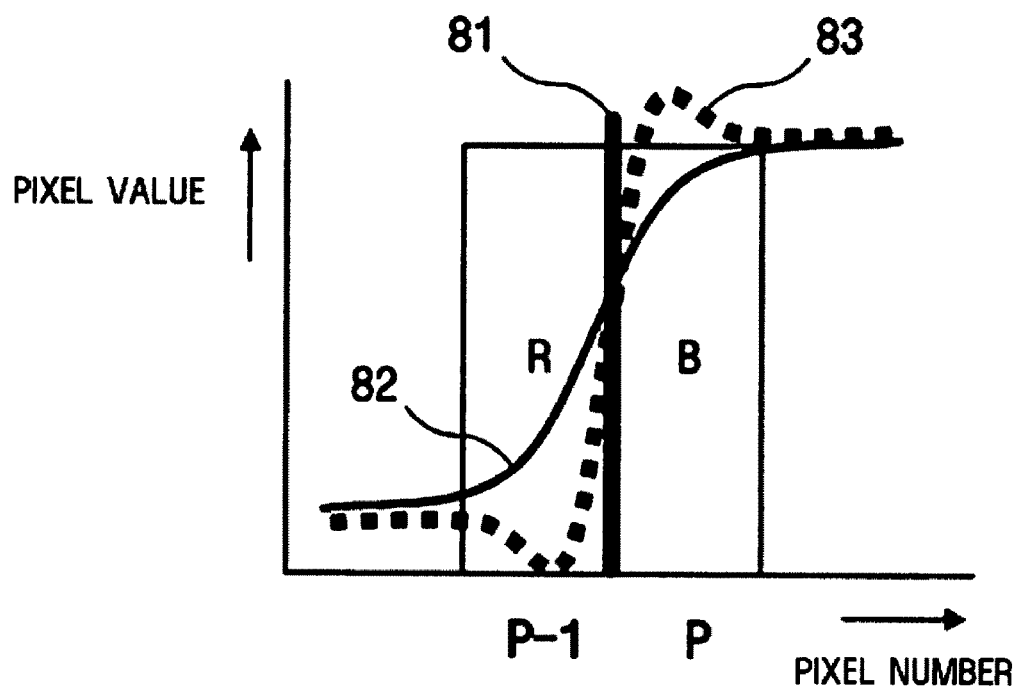
FIG. 8 compares input pixel data and output pixel data in the case of a rising edge.

FIG. 8 compares input pixel data and output pixel data in the case of a rising edge. Referring to a rising edge, such as illustrated in FIG. 8, the level of an input signal 82 may gradually increase as a pixel number increases, so the level of the input signal 82 for a (P−1)-th pixel on the left side of a pixel boundary 81 may be higher than the level of the input signal 82 for a P-th pixel on the right side of the pixel boundary 81. In addition, referring to the rising edge, such as illustrated in FIG. 8, a B component of an output signal 83 may have a higher value than a B component of the input signal 82, and an R component of the output signal 83 may have a lower value than an R component of the input signal 82. Again, this type of distortion may cause a color error band that may be perceived by human vision.

Therefore, one or more embodiments of the present invention provide methods to reduce pixel value distortions that may occur at a falling edge or a rising edge, such as described above with reference to FIGS. 7 and 8. Such methods may generally be classified according to a distorted sub-pixel, correcting a sub-pixel that is adjacent to a distorted sub-pixel, and correcting not only a distorted sub-pixel but also a sub-pixel that is adjacent to the distorted sub-pixel.

Figure 9A:
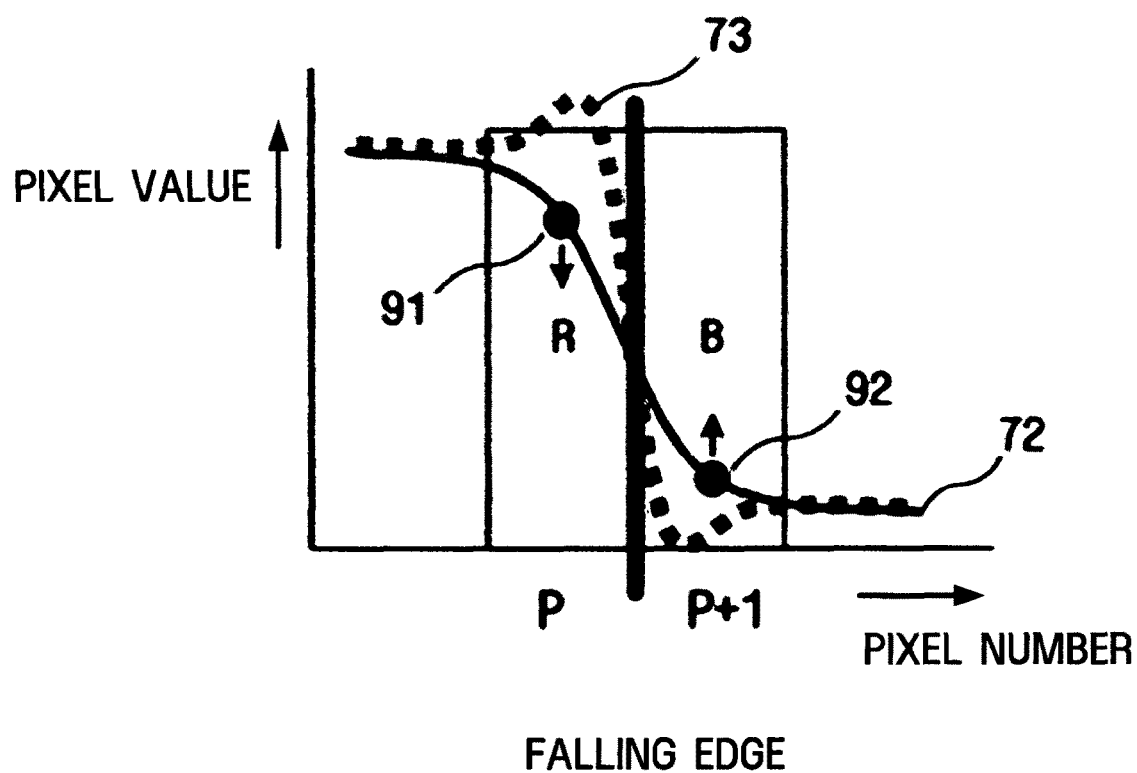
FIGS. 9A and 9B illustrate an embodiment of the present invention.

Referring to a falling edge illustrated in FIG. 9A, a distorted output pixel value may be corrected by reducing an R component value 91 of an input signal 72 by a predetermined amount and increasing a B component value 92 of the input signal 72 by a predetermined amount. A reduced R component value R' obtained by the reduction of the R component value 91 may be represented by Equation 2, for example, and an increased B component value B' obtained by the increase of the B component value 92 may be represented by Equation 3, for example. The reduced R component value R' may be obtained using the difference between a current sub-pixel value R(P) and a subsequent sub-pixel value R(P+1). Likewise, the increased B component B' may be obtained using the difference between a current sub-pixel value B(P) and a subsequent sub-pixel value B(P+1).

The larger the difference between the current sub-pixel value R(P) and the subsequent sub-pixel value R(P+1) or between the current sub-pixel value B(P) and the subsequent sub-pixel value B(P+1), the larger the amount by which the R or B component value 91 or 92 may be increased or reduced.

$$R'=\omega \times \alpha \times \{R(P)-R(P+1)\}+R(P+1) \quad \text{Equation 2}$$

$$B'=\omega \times \beta \times \{B(P)-B(P+1)\}+B(P+1) \quad \text{Equation 3}$$

Here, $\omega$ indicates a weight allocated according to the period of change in pixel values that may be determined based on the value of a pixel belonging to an edge and the value of a pixel adjacent to the pixel belonging to the edge, and $\alpha$ and $\beta$ may be constants that determine the amount by which the value of a sub-pixel of the pixel belonging to the edge is to be varied. The determination of the period of change in pixel values will be described later in greater detail below with reference to FIGS. 14 and 15.

The weight $\omega$ and the constants $\alpha$ and $\beta$ may respectively be within the range of 0 and 1. In an embodiment, for a balanced correction, the sum of the constants $\alpha$ and $\beta$ may be 1. For example, the constants $\alpha$ and $\beta$ may both be set to ½. According to an embodiment, a sub-pixel that is on the far left of each pixel may correspond to a B component, and a sub-pixel that is on the far right of each pixel may correspond to an R component. Given all this, at a falling edge, the amount by which the value of a sub-pixel (B) of a pixel subsequent to a current pixel belonging to an edge is to be increased may be determined based on the amount by which the value of a sub-pixel (R) of the current pixel is reduced.

Figure 9B:
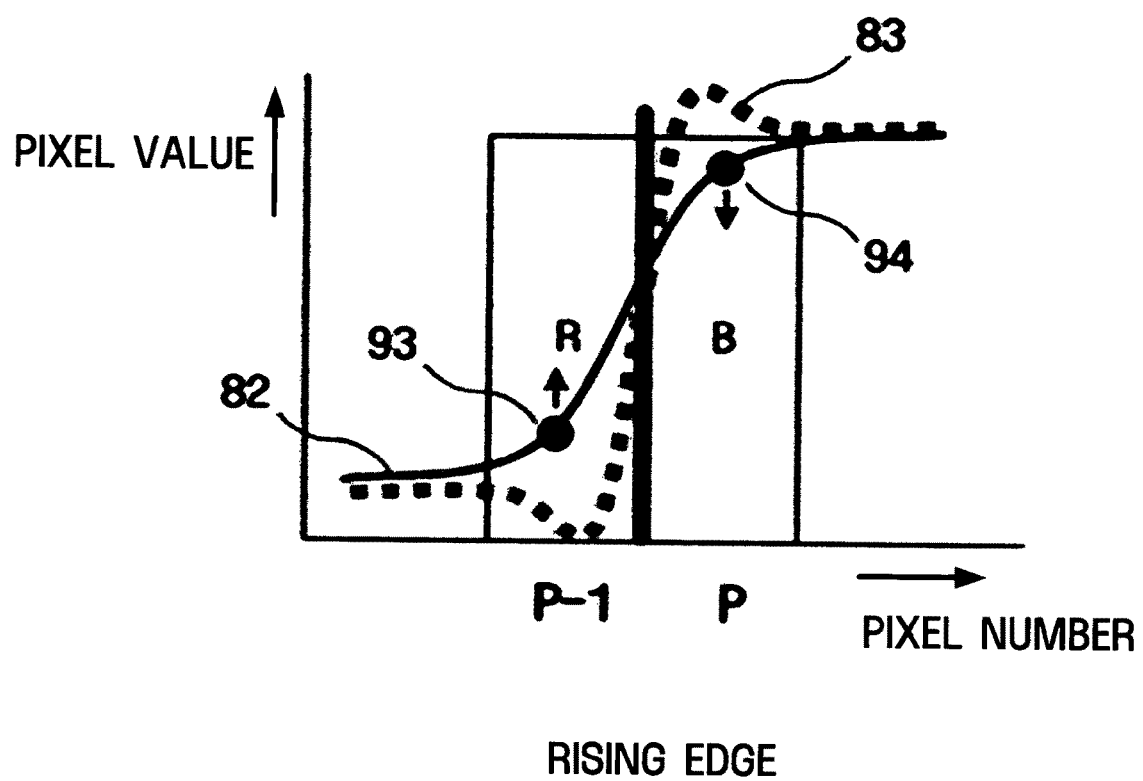

Referring to a rising edge illustrated in FIG. 9B, a distorted output pixel value may be corrected by reducing a B component value 94 of an input signal 82 by a predetermined amount and increasing an R component value 93 of the input signal 82 by a predetermined amount. An increased R component value R' obtained by the increase of the R component value 93 may be represented by Equation 4, and a reduced B component value B' obtained by the reduction of the B component value 94 may be represented by Equation 5, for example. The increased R component value R' may be obtained using the difference between a current sub-pixel value R(P) and a previous sub-pixel value R(P−1). Likewise, the reduced B component value B' may be obtained using the difference between a current sub-pixel value B(P), and a previous sub-pixel value B(P−1).

$$R'=\omega \times \beta \times \{R(P)-R(P-1)\}+R(P-1) \quad \text{Equation 4}$$

$$B'=\omega \times \alpha \times \{B(P)-B(P-1)\}+B(P-1) \quad \text{Equation 5}$$

At a rising edge, the amount by which the value of a sub-pixel (R) on the far right of a previous pixel to a current pixel belonging to an edge is to be increased may be determined based on the amount by which the value of a sub-pixel (B) on the far left of the current pixel is reduced.

In addition, in an embodiment, a distorted sub-pixel may be kept intact and the values of one or more sub-pixels that belong to the same pixel as the distorted sub-pixel may be varied.

Figure 10A:
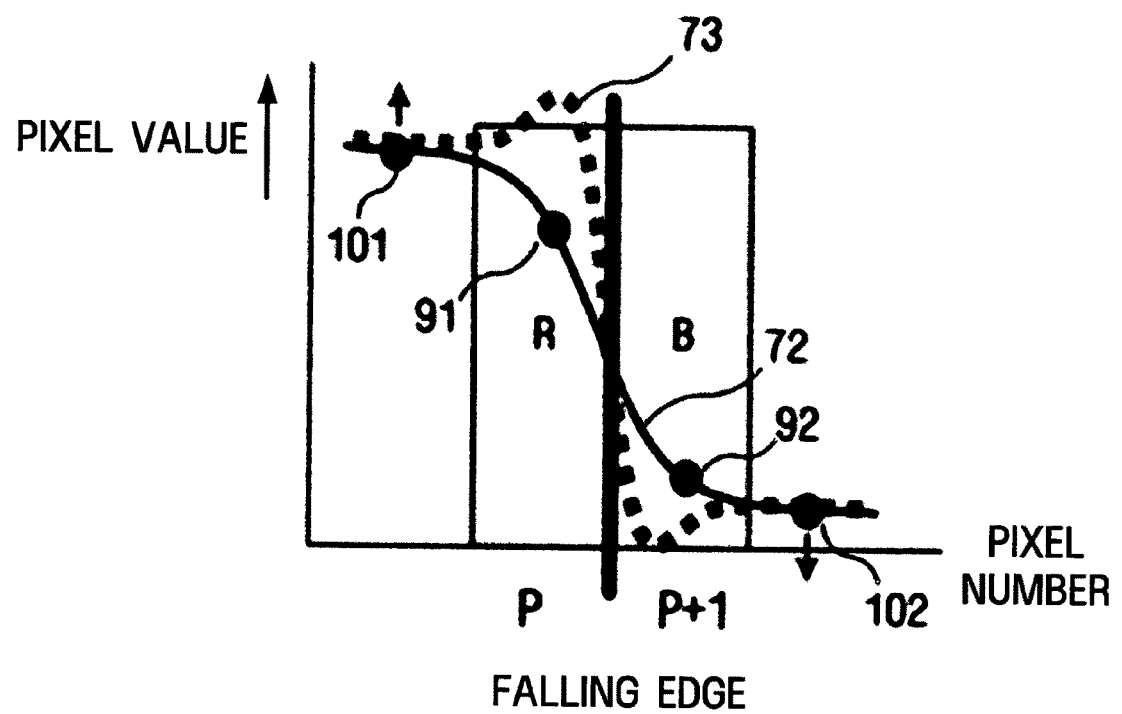
FIGS. 10A and 10B illustrate an embodiment of the present invention.

Referring to a falling edge illustrated in FIG. 10A, B and G component values 101 that respectively correspond to a pair of sub-pixels belonging to the same pixel as a sub-pixel corresponding to an R component value 91, may be increased by a predetermined amount so that the B and G component values 101 may become almost as high as the R component value 91 as output. In other words, at a falling edge which gradually decreases in the direction from the left to the right, the values of a pair of sub-pixels that are respectively on the far left of and in the middle of a pixel may be increased, thereby obtaining the effect of reducing the brightness of a sub-pixel that is on the far right of the pixel. Referring to FIG. 10A, the amount by which the B and G component values 101 are increased may be the same, or similar, for example, as the result of multiplying a correction amount determined by Equation 2, e.g., |R'−R(p)|. Likewise, G and R component values 102 that respectively correspond to a pair of sub-pixels belonging to the same pixel as a sub-pixel corresponding to a B component value 92 may be reduced by a predetermined amount so that the G and R component values 102 as output may become almost as low as the B component value 92 as output. The amount by which the G and R component values 102 are reduced may be similar to a correction amount determined by Equation 3, e.g., |B'−B(p)|.

Figure 10B:
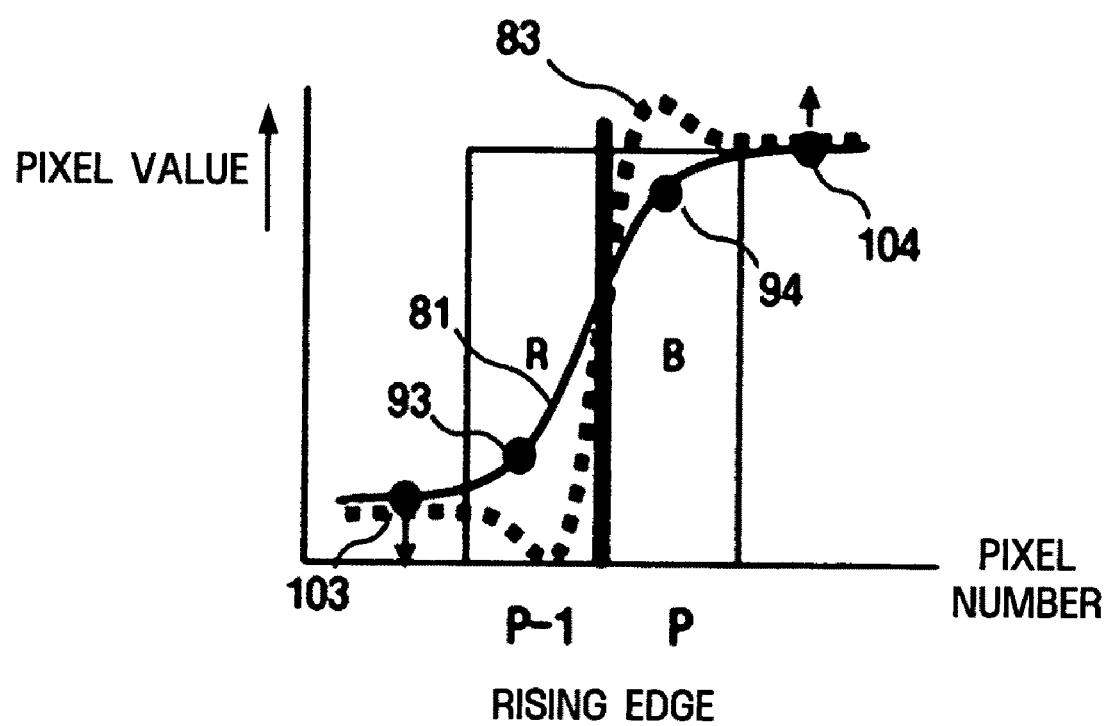

Referring to FIG. 10B, at a rising edge, which gradually increases in the direction from the left to the right, the values of a pair of sub-pixels that are respectively on the far right of and in the middle of a pixel may be increased, thereby obtaining the effect of reducing the brightness of a sub-pixel that is on the far left of the pixel. Here, the amount by which the B and G component values 94 and 103 are decreased may be the same, or similar, for example, as a correction amount determined by Equation 4, e.g., |R'−R(p)|. Likewise, the amount by which the G and R component values 104 and 93 are increased may be the same, or similar, for example, as a correction amount determined by Equation 5, e.g., |B'−B(p)|.

Referring to both the falling edge illustrated in FIG. 10A and a rising edge illustrated in FIG. 10B, if a pair of sub-pixel values 101 and a pair of sub-pixel values 104 all need to be increased, then the amount by which the sub-pixel values 101 need to be increased may be compared with the amount by which the sub-pixel values 104 need to be increased, and whichever of the sub-pixel values 101 and the sub-pixel values 104 correspond to a larger amount may be increased. Similarly, if a pair of sub-pixel values 102 and 103 all need to be increased, then the amount by which the sub-pixel values 101 need to be increased may be compared with the amount by which the sub-pixel values 104 need to be increased, and whichever of the sub-pixel values 101 and the sub-pixel values 104 correspond to a larger amount may be increased.

Alternatively, given that a pixel is affected by one or more adjacent pixels, not only R, G, and B component values of a current pixel but also R, G, and B component values of a pixel adjacent to the current pixel may be increased or reduced so that the R, G, and B components of the current pixel may be visually perceived as having the same levels as their respective counterparts of the pixel adjacent to the current pixel. Here, such an implementation may improve contrast.

Still further, in an embodiment, a distorted sub-pixel may be corrected along with a sub-pixel that is adjacent to the distorted sub-pixel.

Figure 11A:
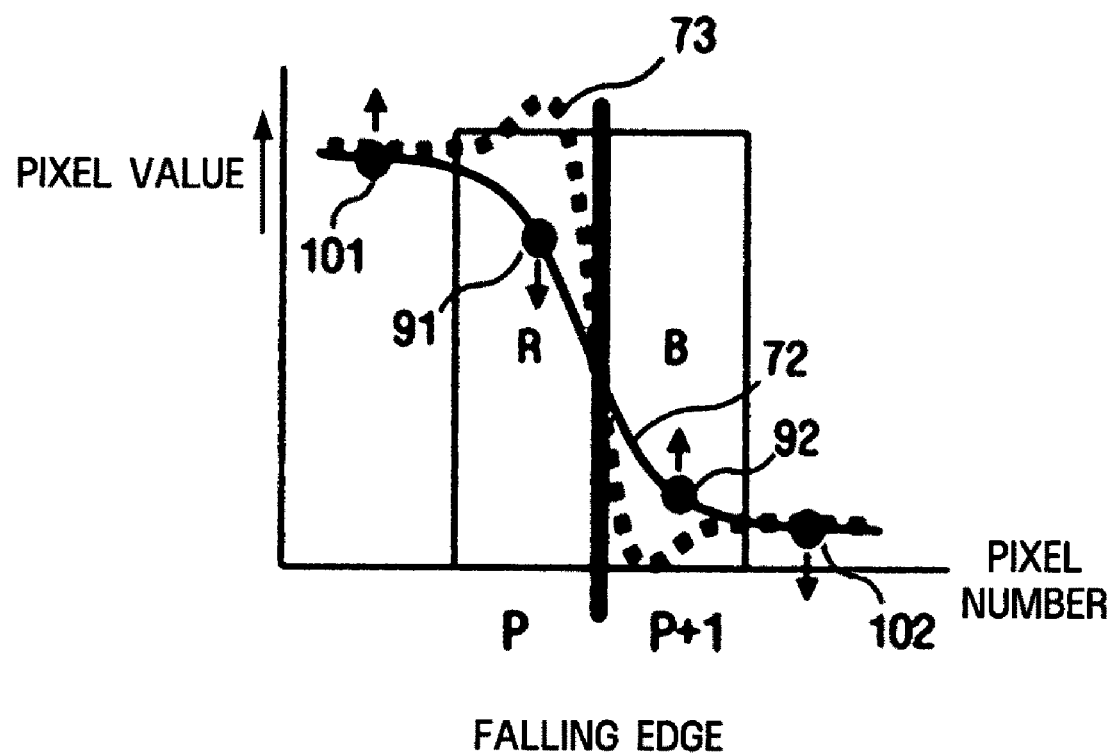
FIGS. 11A and 11B illustrate an embodiment of the present invention.

Referring to a falling edge illustrated in FIG. 11A, values 101 of a pair of sub-pixels that are respectively on the far left of and in the middle of a P-th pixel may be increased by a predetermined amount. If the amount by which the sub-pixel values 101 are increased exceeds a predefined threshold, then a value 91 of a sub-pixel that is on the far right of the P-th pixel may be reduced by a predetermined amount so that all R, G, and B components of the P-th pixel may be visually perceived as having the same level.

The amount by which the sub-pixel values 101 are increased may be determined to be similar or the same as the result of multiplying the correction amount as determined by Equation 2 by a predetermined coefficient γ (where r is typically a constant within the range of 0 and 1), e.g., $|R'-R(P)| \times \gamma$, and the amount by which the sub-pixel value 91 is reduced may be determined to be similar or the same as the result of multiplying the correction amount determined by Equation 2 by $(1-\gamma)$, e.g., $|R'-R(P)| \times (1-\gamma)$. In an embodiment, if the coefficient γ has a value of 0, then only a distorted pixel may be corrected, and if the coefficient γ has a value of 1, then only values of sub-pixels adjacent to the distorted sub-pixel may be corrected.

Likewise, values 102 of a pair of sub-pixels that are respectively in the middle of and on the far right of a (P+1)-th pixel may be reduced by a predetermined amount. If the amount by which the sub-pixel values 102 are reduced exceeds a predefined threshold, then a value 92 of a sub-pixel that is on the far left of the (P+1)-th pixel may be increased by a predetermined amount.

The amount by which the sub-pixel values 102 are reduced may be determined to be the same or similar to the result of multiplying the correction amount determined by the above Equation 2 by the coefficient γ, e.g., $|B'-B(P)| \times \gamma$, and the amount by which the sub-pixel value 92 is increased may be determined to be the same or similar to the result of multiplying the correction amount determined by Equation 3 by $(1-\gamma)$, e.g., $|B'-B(P)| \times (1-\gamma)$.

Figure 11B:
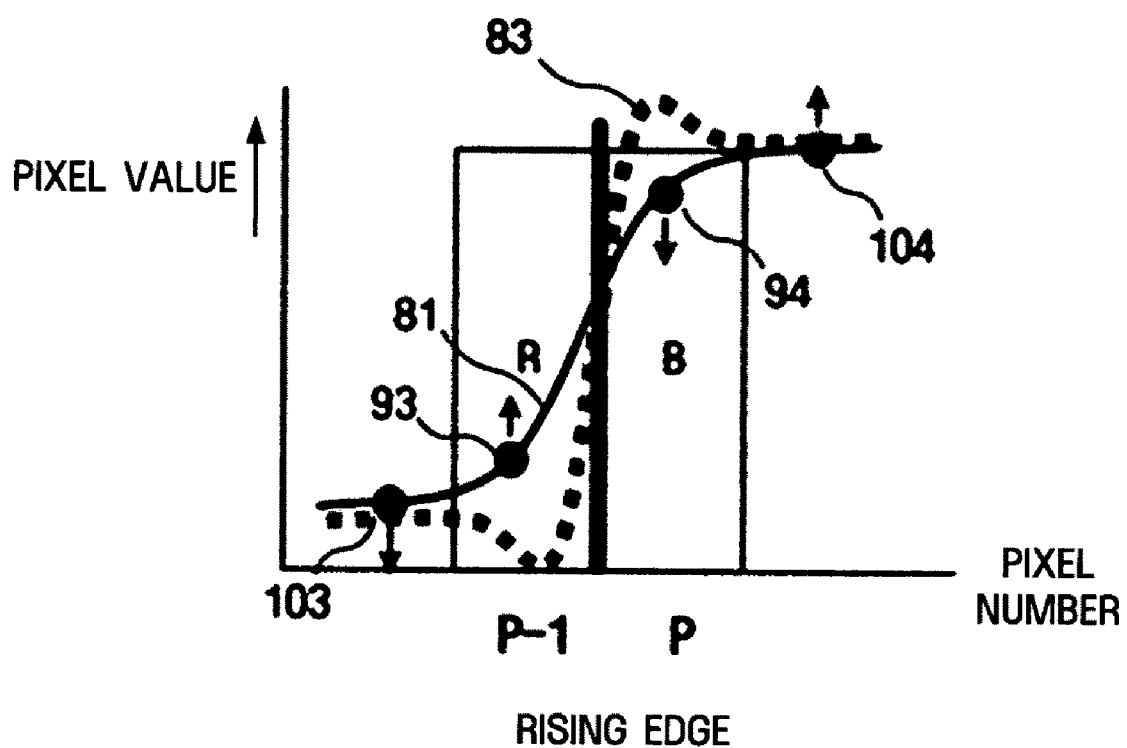

Referring to a rising edge illustrated in FIG. 11B, values 104 of a pair of sub-pixels that are respectively on the far right of and in the middle of the P-th pixel may be increased by a predetermined amount. If the amount by which the sub-pixel values 104 are increased exceeds a predefined threshold, then a value 94 of a sub-pixel that is on the far left of the P-th pixel may be reduced so that all R, G, and B components of the P-th pixel may be visually perceived as having the same level.

The amount by which the sub-pixel values 104 are increased may be determined to be the same or similar to the result of multiplying a correction amount determined by Equation 5 by the coefficient γ, e.g., $|B'-B(P)| \times \gamma$, and the amount by which the sub-pixel value 94 is reduced may be determined to be the same or similar to the result of multiplying the correction amount determined by Equation 5 by $(1-\gamma)$, e.g., $|B'-B(P)| \times (1-\gamma)$.

Likewise, values 103 of a pair of sub-pixels that are respectively in the middle of and on the far left of a (P−1)-th pixel may be reduced by a predetermined amount. If the amount by which the sub-pixel values 103 are reduced exceeds a predefined threshold, then a value 93 of a sub-pixel that is on the far right of the (P−1)-th pixel may be increased by a predetermined amount.

The amount by which the sub-pixel values 103 are reduced may be determined to be the same or similar to the result of multiplying a correction amount determined by Equation 4 by the coefficient γ, e.g., $|R'-R(P)| \times \gamma$, and the amount by which the sub-pixel value 93 is increased may be determined to be the same or similar to the result of multiplying the correction amount determined by Equation 4 by $(1-\gamma)$, e.g., $|R'-R(P)| \times (1-\gamma)$.

Additionally, in an embodiment having a plurality of distorted pixels, only those which correspond to a bright area in an image may be corrected, i.e., selected distorted pixels are corrected, while keeping those which correspond to a dark area in the image intact.

In other words, at a falling edge, B and G component values 101, of FIG. 10A, that respectively correspond to a pair of sub-pixels belonging to the same pixel as a sub-pixel corresponding to an R component value 91 may be increased by the correction amount determined by Equation 2, e.g., $|R'-R(p)|$. On the other hand, at a rising edge, the G and R component values 104, of FIG. 10B, that respectively correspond to a pair of sub-pixels belonging to the same pixel as a sub-pixel corresponding to a B component value 94 may be increased by the correction amount determined by Equation 5, e.g., $|B'-B(p)|$.

However, in this example explained with reference to FIGS. 10A and 10B, values 102 of a pair of sub-pixels that belong to the same pixel as a sub-pixel corresponding to a B component value 92 or values 103 of a pair of sub-pixels that belong to the same pixel as a sub-pixel corresponding to an R component value 93 may not be varied because, due to general characteristics of display apparatuses, distortions that occur in a bright area in an image are more apparent than distortions that occur in a dark area in the image For this reason, with reference to FIGS. 9A and 9B again, in an embodiment, the sub-pixel value 92 and the sub-pixel value 93 may not be varied because they correspond to a dark area.

Figure 12:
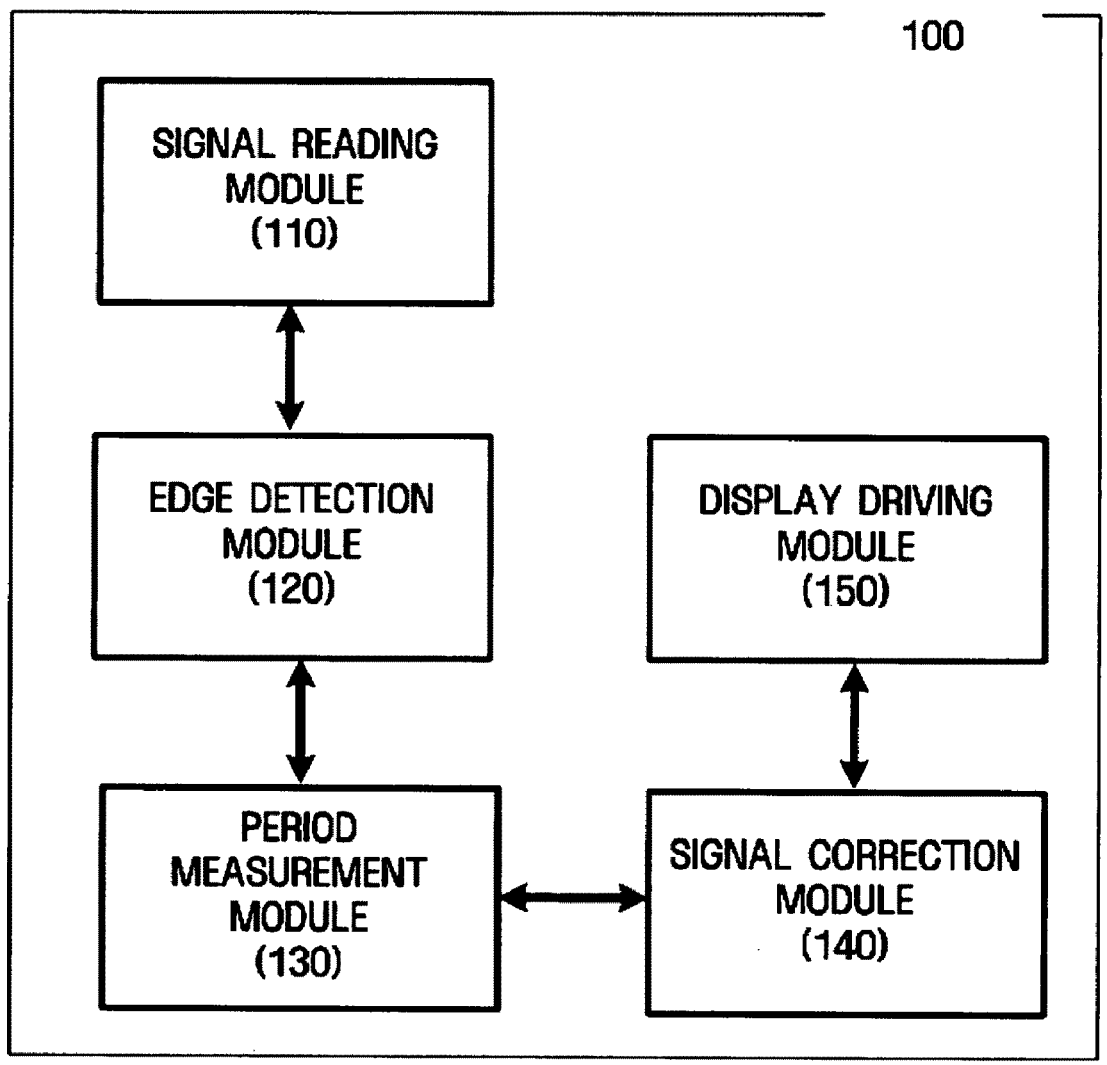
FIG. 12 illustrates an image signal display system, according to an embodiment of the present invention.

FIG. 12 illustrates an image signal display system 100 that may implement one or more embodiments of the present invention. Referring to FIG. 12, the image signal display system 100 may include, for example, a signal reading module 110, an edge detection module 120, a period determination module 130, a signal correction module 140, and a display driving module 150.

The signal reading module 110 may receive an input image (e.g., a still image or a moving image), and may read and output the values of a plurality of sub-pixels (e.g., B, G, and R components) of each pixel of the input image. In addition, the input image may be an image obtained by decompressing an original image with the aid of a video decoder or may be a non-compressed original image. If the input image has a different signal format from the signal format supported by the image signal display system 100, e.g., if the input image is an YCbCr image, then the signal reading module 110 may, in an embodiment, convert the input image into an RGB image and output the RGB image.

The edge detection module 120 may receive R, G, and B signals output by the signal reading module 110, and determine whether a pixel (hereinafter referred to as the current pixel) corresponding to the received R, G, and B signals belongs to an edge. If the current pixel belongs to an edge, then the edge detection module 120 may determine the intensity of the edge based on a difference between the brightness of the current pixel and the brightness of at least one previous pixel or a difference between the brightness of the current pixel and the brightness of at least one subsequent pixel. Alternatively, the edge detection module 120 may determine the intensity of the edge based on differences between the brightness of sub-pixels of the current pixel and the brightness of respective corresponding sub-pixels of at least one previous pixel or differences between the brightness of the sub-pixels of the current pixel and the brightness of respective corresponding sub-pixels of at least one subsequent pixel. If the current pixel belongs to an edge, then the edge detection module 120 may determine the type of edge, e.g., determines whether the edge is a rising edge or a falling edge based on the intensity of the edge, and may notify the period determination module 130 of the result of the determination by transmitting a notification signal. Once the type of edge to which the current pixel belongs is determined, the direction of the edge may be determined. If the result of subtracting the value of a subsequent pixel from the value of the current pixel has a positive value, then the edge detection module 120 may determine that an edge to which the current pixel belongs is a falling edge. On the other hand, if the result of subtracting the value of the previous pixel from the value of the current pixel has a positive value, then the edge detection module 120 may determine that the edge to which the current pixel belongs is a rising edge. The notification signal may be represented by two bits; a first bit indicating whether the current pixel belongs to an edge and a second bit indicating whether the edge is a falling edge or a rising edge, noting that alternate embodiments are equally available.

Here, the value of the current pixel, the value of the previous pixel, and the value of the subsequent pixel may be grayscales Y defined by Equation 1, for example.

The detection of an edge may be performed using a representative value of a sub-pixel such as grayscale Y. In order to enhance the precision of edge detection, it may be determined whether the value of each sub-pixel exceeds a predefined threshold. Alternatively, the detection of an edge may be performed by comparing an R component of each pixel with a threshold at a falling edge and comparing a B component of each pixel with a threshold at a rising edge.

Proceeding with the above example, if the first bit of the notification signal transmitted by the edge detection module 120 indicates that the current pixel does not belong to an edge, then the period determination module 130 may readily transmit the input RGB signal to the display driving module 150. On the other hand, if the first bit of the notification signal transmitted by the edge detection module 120 indicates that the current pixel belongs to an edge, then the period determination module 130 determines the period of change in pixel values based on the value of the current pixel and the value of a pixel that is adjacent to the current pixel. In detail, the period determination module 130 may determine whether a change in pixel values has occurred by comparing the value of the current pixel with the value of the previous pixel or the value of the subsequent pixel. If it is determined that a change in pixel values has occurred, the period determination module 130 may determine the period of the change in pixel values. The change in pixel values may be measured based on the brightness of the current pixel and the previous or subsequent pixel, and the intensity of an edge to which the current pixel belongs. The determination of the period of change in pixel values will hereinafter be described later in greater detail with reference to FIGS. 14 and 15.

The signal correction module 140 may determine whether the current pixel belongs to a rising edge or a falling edge based on the second bit of the notification signal transmitted by the edge detection module 120. In addition, in an embodiment, the signal correction module 140 may allocate a weight ω according to the period of change in pixel values determined by the period determination module 130, and correct a plurality of sub-pixels (R, G, and B components) of each pixel belonging to the rising edge or the falling edge. Then, the signal correction module 140 may transmit the results of the correction to the display driving module 150. Such a correction of sub-pixels of a pixel has already been described, and thus an additional description thereof will be omitted.

The display driving module 150 may drive a display system, which may be included in the same, such as a liquid crystal display (LCD), a plasma display panel (PDP), or an organic light-emitting diode (OLED) according to a sub-pixel-based signal transmitted by the signal correction module 510. The display driving module 150 controls the display system to display the sub-pixel-based signal.

Figure 13:
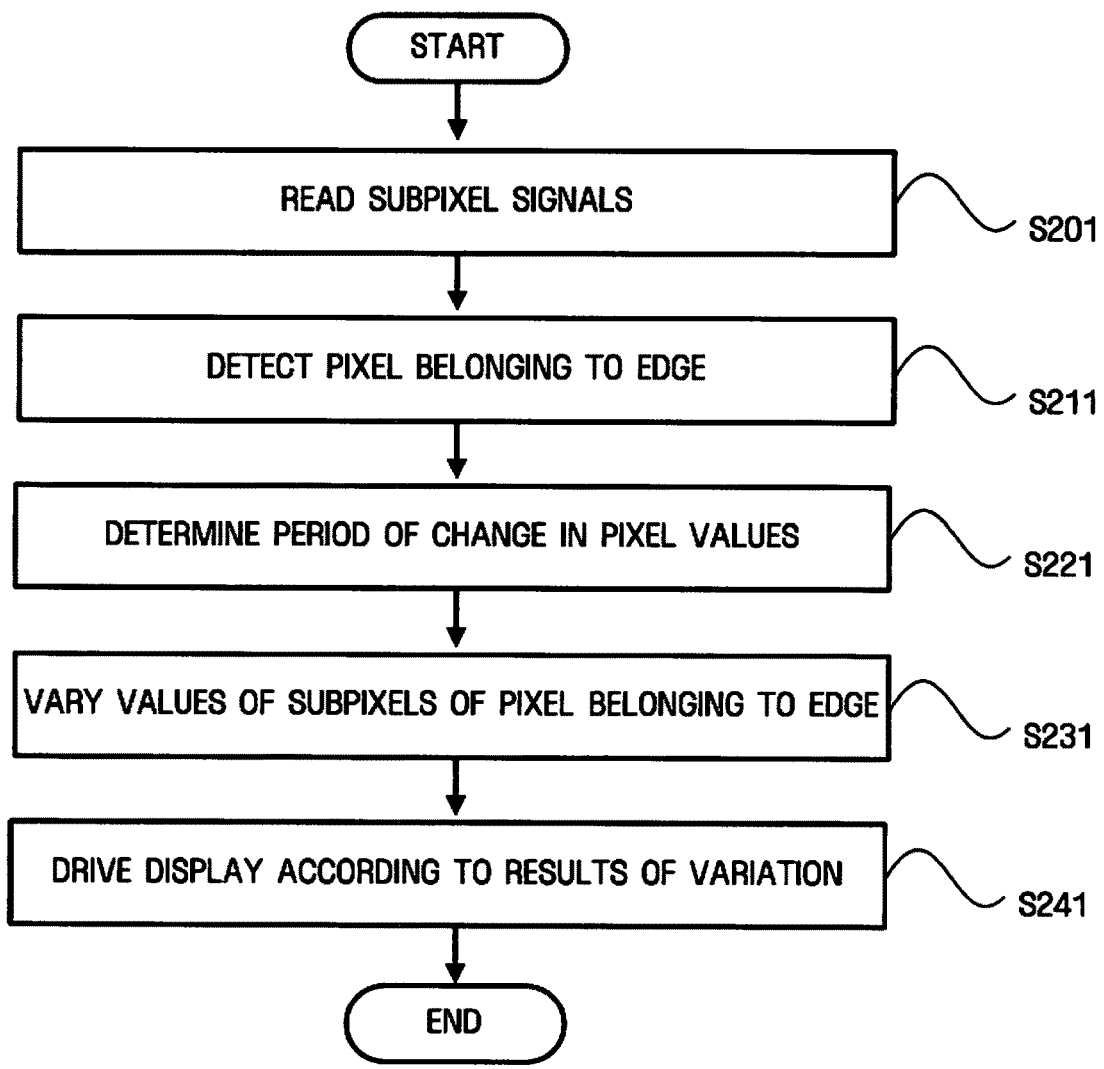
FIG. 13 illustrates a method of processing an image signal, according to an embodiment of the present invention.

FIG. 13 illustrates a method of processing an image signal, according to an embodiment of the present invention. Referring to FIG. 13, in operation S201, an input image may be received, and read, and a plurality of sub-pixels (e.g., B, G, and R components) of each pixel of the input image may be output, e.g. by the signal reading module 110.

In operation S211, a pixel that belongs to an edge of the input image may be detected, e.g., by the edge detection module 120.

Here, in an embodiment, S211 may include determining whether a current pixel belongs to an edge; and, if the current pixel is determined to belong to an edge, determining the type of the edge, for example. Alternatively, operation S211 may be performed by determining the type of the edge in the input image and determining whether the current pixel belongs to the corresponding edge. In detail, it may be determined whether the current pixel belongs to an edge by determining whether the difference between the brightness of the current pixel and the brightness of a previous pixel, or between the brightness of the current pixel and the brightness of a subsequent pixel, exceeds a predefined threshold. Alternatively, it may be determined whether the current pixel belongs to an edge by determining whether the differences between the brightness of sub-pixels of the current pixel and the brightness of respective corresponding sub-pixels of the previous pixel, or between the brightness of sub-pixels of the current pixel and the brightness of respective corresponding sub-pixels of the subsequent pixel exceed a predefined threshold. If the current pixel is determined to belong to an edge and the result of subtracting the brightness of the subsequent pixel from the brightness of the current pixel has a positive value, then the edge may be determined to be a falling edge. On the other hand, if the current pixel is determined to belong to an edge and the result of subtracting the brightness of the pervious pixel from the brightness of the current pixel has a positive value, then the edge may be determined to be a rising edge, although alternate edge detection techniques are equally available.

In operation S221, the period of change in pixel values may be determined based on the value of the current pixel and the value of a pixel that is adjacent to the current pixel, e.g., by the period determination module 130.

In operation S231, a weight ω may be allocated, e.g., by the signal correction module 140, according to the period of change in pixel values determined, e.g. by the period determination module 130, and the sub-pixels of the current pixel may be corrected, e.g., by the signal correction module 140 using the weight ω.

In operation S241, a display such as an LCD, a PDP, or an OLED may be driven, e.g., by the display driving module 150, according to the results of the correction, e.g., as performed by the signal correction module 140.

Figure 14:
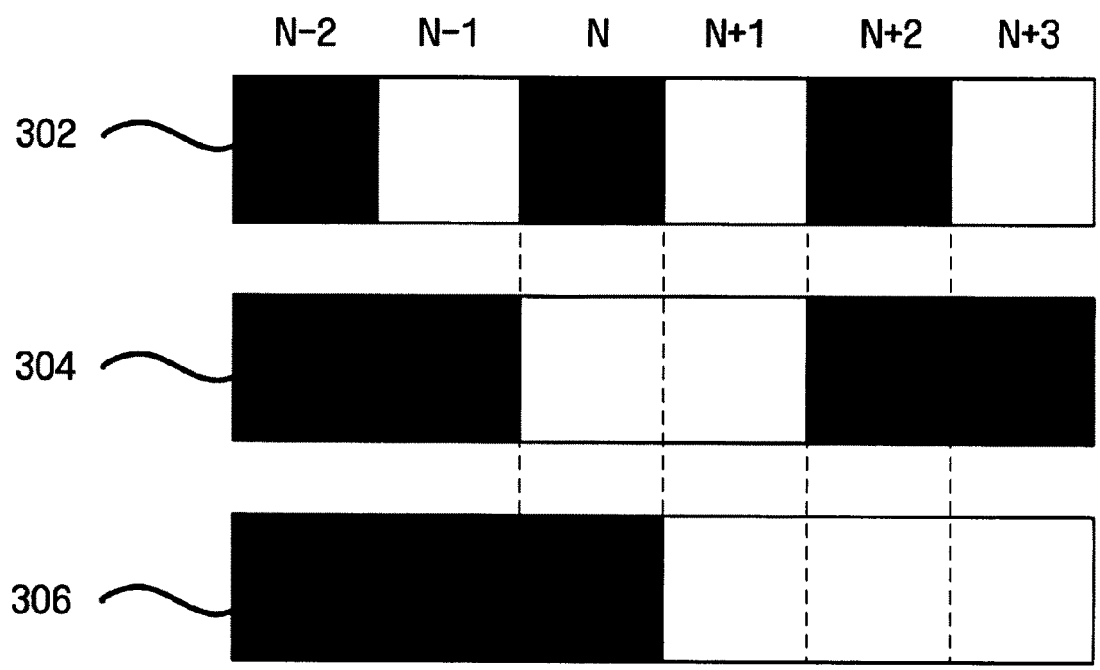
FIG. 14 explains the period of change in pixel values, according to an embodiment of the present invention.

FIG. 14 explains the period of change in pixel values, according to an embodiment of the present invention. As described above, the period determination module 130. for example, discussed in operation 231, may determine the period of change in pixel values based on the value of a current pixel belonging to an edge and the value of a pixel that is adjacent to the current pixel. In detail, in this example the period determination module 130 may determine whether a change in pixel values has occurred based on the difference between the value of the current pixel and the value of at least one previous pixel or at least one subsequent pixel. If it is determined that a change in pixel values has occurred, then the period determination module 130 may determine the period of the change in pixel values. Referring to reference numeral 302 of FIG. 14, the period of change in pixel values is 2 (pixels). Referring to reference numeral 304 of FIG. 14, the period of change in pixel values is 4 (pixels). Referring to reference numeral 306 of FIG. 14, the period of change in pixel values is 6 (pixels). Therefore, the period of change in pixel values indicated by reference numeral 302 may correspond to a higher frequency of variation than the period of change in pixel values indicated by reference numeral 304 or 306. This will hereinafter be described in greater detail with reference to FIG. 15, together with a method of allocating a weight according to the period of change in pixel values.

Figure 15:
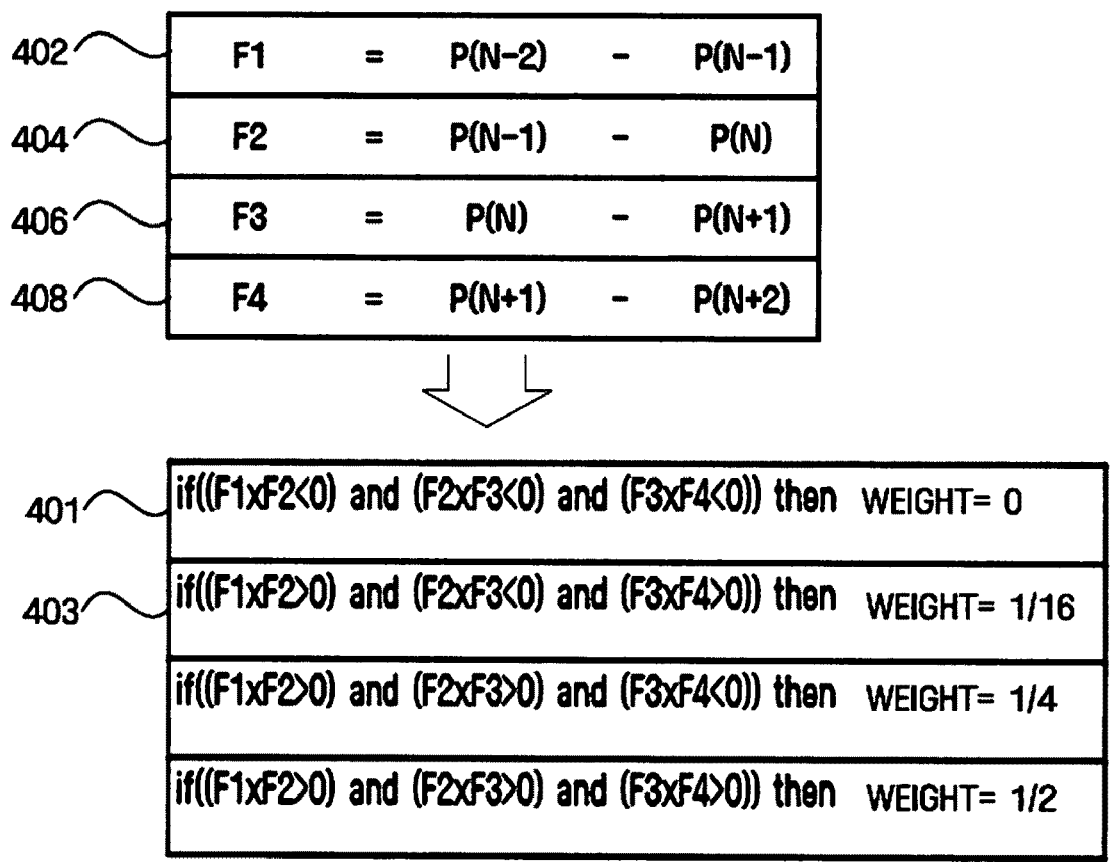
FIG. 15 explains a method of allocating a weight according to the period of change in pixel values, according to an embodiment of the present invention.

FIG. 15 explains a method of allocating a weight according to the period of change in pixel values, according to an embodiment of the present invention. As described above, the signal correction module 140, for example, may allocate a weight ω according to the period of change in pixel values, as may be determined in the manner illustrated in FIG. 14. Then, the signal correction module 140 may correct a plurality of sub-pixels (R, G, and B components) of each pixel using the weight ω. The determination of the period of change in pixel values and the allocation of a weight will hereinafter be described in greater detail with reference to FIG. 15. Referring to FIG. 15, assume that a plurality of (N−2)-th through (N+2)-th pixels illustrated in FIG. 14 belong to an edge and that the N-th pixel is a reference pixel.

A difference F1 may be calculated (402) between a value P(N−2) of the (N−2)-th pixel and a value P(N−1) of the (N−1)-th pixel, e.g., by the period determination module. In this manner, pixel value differences F2 (404), F3 (406), and F4 (408) may be calculated, e.g, by the period determination module 130.

According to a first calculation result 401, the result of multiplying F1 of equation 402 and F2 of equation 404, the result of multiplying F2 of equation 404 and F3 of equation 406, and the result of multiplying F3 of equation 406 and F4 of equation 408 may all have negative values. In this case, the period of change in pixel values corresponding to the situation indicated by the first equation 404 may be determined to be as short as 2 (pixels), e.g., by the period determination module 130. According to a second calculation result 403, the result of multiplying F1 of equation 402 and F2 of equation 404 may have a positive value, whereas the result of multiplying F2 of equation 404 and F3 of equation 406 and, the result of multiplying F3 of equation 406 and F4 of equation 408 both may have negative values. In this case, the period of change in pixel values corresponding to the situation indicated by the second calculation result 403 may be determined as 4 (pixels), e.g., by the period determination module 130. In the aforementioned manner, the period of change may be determined in pixel values, e.g., by the period determination module 130. Then, a weight may be allocated, e.g., by the signal correction module 140, according to the period of change in pixel values as determined, e.g., by the period determination module 130. In detail, using this example, if the period of change in pixel values is determined to be 2 (pixels) by the period determination module 130, then a weight of 0 may be allocated by the signal correction module 140. If the period of change in pixel values is determined to be 4 (pixels), then the a weight of ⅟₁₆ may be allocated. If the period of change in pixel values is 6 (pixels), then a weight of ¼ may be allocated. Then, the weight allocated may be used in the aforementioned manner by the signal correction module 140, to correct a plurality of sub-pixels (R, G, and B components) of each pixel belonging to an edge (e.g., a rising edge or a falling edge).

The system method, and medium processing an image signal according to one or more embodiments of the present invention may have the following advantages.

First, the clarity of edge areas in an image may be improved by reducing a color error band that may be generated by sub-pixel rendering.

Second, the present invention may be applied to various image signal display apparatuses such as PDPs, LCDs, or OLEDs having a stripe sub-pixel structure.

Third, it may be possible to sophisticatedly reduce a color band using a weight allocated according to the period of change in pixel values.

The term 'module', as used herein, may mean, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules.

With this in mind and n addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method processing an image signal, the method comprising: detecting a pixel belonging to an edge in an input image;
   determining a period of change in pixel values based on a first value of the pixel belonging to the edge and a second value of a pixel that is adjacent to the pixel belonging to the edge; and
   correcting, by way of a processor, one or more sub-pixels of the pixel belonging to the edge using a weight allocated according to the determined period.

2. The method of claim 1, wherein the detecting of the pixel comprises:
   determining an intensity of an edge to which a current pixel belongs; and
   determining whether the edge to which the current pixel belongs is a rising edge or a falling edge based on the determined intensity.

3. The method of claim 2, wherein the determining of the intensity comprises determining the intensity of the edge to which the current pixel belongs based on a difference between a first brightness of the current pixel and a second brightness of at least one previous pixel or a difference between the first brightness and a third brightness of at least one subsequent pixel.

4. The method of claim 2, wherein the determining of the intensity comprises determining the intensity of the edge to which the current pixel belongs based on differences between a first brightness of sub-pixels of the current pixel and a second brightness of respective corresponding sub-pixels of at least one subsequent pixel or differences between the first brightness and a third brightness of respective corresponding sub-pixels of at least one previous pixel.

5. The method of claim 2, wherein the determining of the edge comprises:
   determining that the current pixel belongs to the falling edge if the result of subtracting a first brightness of a subsequent pixel from a second brightness of the current pixel has a first value that is positive; and
   determining that the current pixel belongs to the rising edge if the result of subtracting a third brightness of the previous pixel from the second brightness of the current pixel has a second value that is positive.

6. The method of claim 1, wherein the correcting of the one or more sub-pixels comprises:
   reducing a third value of a sub-pixel located right of the pixel belonging to the edge if the edge is a falling edge; and
   reducing a fourth value of a sub-pixel located left of the pixel belonging to the edge if the edge is a rising edge.

7. The method of claim 6, wherein:
   an amount by which the third value of the sub-pixel located right of the pixel belonging to the edge is reduced, is determined based on a result of multiplying a difference between the first value of the pixel belonging to the edge and a fifth value of a subsequent pixel to the pixel belonging to the edge or a difference between the third value of the sub-pixel located right of the pixel belonging to the edge and a sixth value of a sub-pixel located right of the subsequent pixel by a weight ω and a coefficient α; and
   an amount by which the fourth value of the sub-pixel located left of the pixel belonging to the edge is reduced, is determined based on a result of multiplying a difference between the first value of the pixel belonging to the edge and a seventh value of a previous pixel to the pixel belonging to the edge or a difference between the third value of the sub-pixel located right of the pixel belonging to the edge and an eighth value of a sub-pixel located right of the previous pixel by the weight ω and the coefficient α, the coefficient α being a constant between 0 and 1.

8. The method of claim 6, wherein the correcting of the one or more sub-pixels further comprises:
   increasing a fifth value of a sub-pixel located left of a subsequent pixel to the pixel belonging to the edge in consideration of an amount by which the third value of the sub-pixel located right of the pixel belonging to the edge is reduced, if the edge is a falling edge; and
   increasing a sixth value of a sub-pixel located right of a previous pixel to the pixel belonging to the edge in consideration of an amount by which the fourth value of the sub-pixel located left of the pixel belonging to the edge is reduced, if the edge is a rising edge.

9. The method of claim 1, wherein the correcting of the one or more sub-pixels comprises:
   increasing values of a pair of sub-pixels that are respectively located left of and in between the pixel belonging to the edge so that a first brightness of a sub-pixel located right of the pixel belonging to the edge may be relatively reduced, if the edge is a falling edge that decreases in a direction from left to right of the image; and
   increasing values of the sub-pixels that are respectively located in between and right of the pixel belonging to the edge so that a second brightness of the sub-pixel located left of the pixel belonging to the edge can be relatively reduced, if the edge is a rising edge that increases in the direction from left to right.

10. The method of claim 9, wherein an amount $\Delta_1$ by which values of the sub-pixels that are respectively located left of and in between the pixel belonging to the edge are increased, is determined based on a result of multiplying a difference between the value of the sub-pixel located right of the pixel belonging to the edge and the value of a sub-pixel located right of a subsequent pixel to the pixel belonging to the edge by a weight ω and a coefficient α, the coefficient being a constant between 0 and 1.

11. The method of claim 9, wherein an amount $\Delta_2$ by which values of the sub-pixels that are respectively located between and right of the pixel belonging to the edge are increased, is determined based on a result of multiplying a difference between the value of the sub-pixel located left of the pixel belonging to the edge and the value of a sub-pixel located left of a previous pixel to the pixel belonging to the edge by a weight ω and a coefficient α, the coefficient being a constant between 0 and 1.

12. The method of claim 9, wherein the correcting of the one or more sub-pixels further comprises:
   reducing values of the sub-pixels that are respectively located in between and right of a subsequent pixel to the pixel belonging to the edge in consideration of an amount by which the values of the sub-pixels that are respectively located left of and in between the pixel belonging to the edge are increased if the edge is the falling edge that decreases in the direction from left to right; and
   reducing values of the sub-pixels that are respectively located left of and in between a previous pixel to the pixel belonging to the edge in consideration of an amount by which the values of the sub-pixels that are respectively located in between and right of the pixel belonging to the edge are increased if the edge is the rising edge that increases in the direction from left to right.

13. The method of claim 9, wherein, if values of the sub-pixels that are respectively located left of and in between the pixel belonging to the edge and the values of the sub-pixels that are respectively located in between and right of the pixel belonging to the edge all need to be increased, the correcting of the one or more sub-pixels further comprises comparing an amount by which the values of the sub-pixels that are respectively located left of and in between the pixel belonging to the edge are to be increased and an amount by which the values of the sub-pixels that are respectively located in between and right of the pixel belonging to the edge are to be increased and increasing whichever of the sub-pixels located left of and in between the pixel belonging to the edge and the sub-pixels located in between and right of the pixel belonging to an edge corresponds to a larger amount.

14. The method of claim 9, wherein values of red (R), green (G), and blue (B) components of the pixel belonging to the edge or values of R, G, and B components of a pixel adjacent to the pixel belonging to the edge are varied so that the brightness of the sub-pixel located right or left of the pixel belonging to the edge can be relatively reduced.

15. The method of claim 1, wherein the determining of the period of change comprises determining the period of change in pixel values based on a difference between a first value of the pixel belonging to the edge and a third value of at least one previous pixel to the pixel belonging to the edge or a difference between the first value of the pixel belonging to the edge and a fourth value of at least one subsequent pixel to the pixel belonging to the edge.

16. The method of claim 1, further comprising displaying the corrected one or more sub-pixels on a display, with the display being one or more of a liquid crystal display (LCD), a plasma display panel (PDP), a light-emitting diode (LED), and an organic light-emitting diode (OLED).

17. A system processing an image signal, the system comprising:
a processor to control one or more processor-executable modules:
an edge detection module to detect a pixel belonging to an edge in an input image;
a period determination module to determine a period of change in pixel values based on a first value of the pixel belonging to the edge and a second value of a pixel that is adjacent to the pixel belonging to the edge; and
a signal correction module to correct one or more sub-pixels of the pixel belonging to the edge using a weight allocated according to a result of the determination performed by the period determination module.

18. The system of claim 17, wherein the edge detection module determines an intensity of an edge to which a current pixel belongs, and
determines whether the edge to which the current pixel belongs is a rising edge or a falling edge based on the determined intensity.

19. The system of claim 18, wherein the edge detection module determines the intensity of the edge to which the current pixel belongs based on a difference between a first brightness of the current pixel and a second brightness of at least one previous pixel or a difference between the first brightness and a third brightness of at least one subsequent pixel.

20. The system of claim 18, wherein the edge detection module determines the intensity of the edge to which the current pixel belongs based on differences between a first brightness of sub-pixels of the current pixel and a second brightness of respective corresponding sub-pixels of at least one subsequent pixel or differences between the first brightness and a third brightness of respective corresponding sub-pixels of at least one previous pixel.

21. The system of claim 18, wherein the edge detection module determines that the current pixel belongs to the falling edge if the result of subtracting a first brightness of a subsequent pixel from a second brightness of the current pixel has a first value that is positive, and determines that the current pixel belongs to the rising edge if the result of subtracting a third brightness of the previous pixel from the second brightness of the current pixel has a second value that is positive.

22. The system of claim 17, wherein the signal correction module reduces a third value of a sub-pixel located right of the pixel belonging to the edge if the edge is a falling edge, and reduces a fourth value of a sub-pixel located left of the pixel belonging to the edge if the edge is a rising edge.

23. The system of claim 22, wherein:
an amount by which the third value of the sub-pixel located right of the pixel belonging to the edge is reduced, is determined based on a result of multiplying a difference between the first value of the pixel belonging to the edge and a fifth value of a subsequent pixel to the pixel belonging to the edge or a difference between the third value of the sub-pixel located right of the pixel belonging to the edge and a sixth value of a sub-pixel located right of the subsequent pixel by a weight ω and a coefficient α; and
an amount by which the fourth value of the sub-pixel located left of the pixel belonging to the edge is reduced, is determined based on a result of multiplying a difference between the first value of the pixel belonging to the edge and a seventh value of a previous pixel to the pixel belonging to the edge or a difference between the third value of the sub-pixel located right of the pixel belonging to the edge and an eighth value of a sub-pixel located right of the previous pixel by the weight ω and the coefficient α, the coefficient α being a constant between 0 and 1.

24. The system of claim 22, wherein the signal correction module increases a fifth value of a sub-pixel located left of a subsequent pixel to the pixel belonging to the edge in consideration of an amount by which the third value of the sub-pixel located right of the pixel belonging to the edge is reduced if the edge is a falling edge, and increases a sixth value of a sub-pixel located right of a previous pixel to the pixel belonging to the edge in consideration of an amount by which the fourth value of the sub-pixel located left of the pixel belonging to the edge is reduced, if the edge is a rising edge.

25. The system of claim 17, wherein the signal correction module increases values of a pair of sub-pixels that are respectively located left of and in between the pixel belonging to the edge so that a first brightness of a sub-pixel located right of the pixel belonging to the edge may be relatively reduced, if the edge is a falling edge that decreases in a direction from left to right, and increases values of the sub-pixels that are respectively in between and located right of the pixel belonging to the edge so that the brightness of the sub-pixel that is on the left of the pixel belonging to the edge can be relatively reduced, if the edge is a rising edge that increases in the direction from left to right.

26. The system of claim 25, wherein the signal correction module increases values of the sub-pixels that are respectively located left of and in between the pixel belonging to the edge by an amount $\Delta_1$ when the edge is a falling edge that decreases in a direction from left to right, wherein the amount $\Delta_1$ being determined based on a result of multiplying a difference between the value of the sub-pixel located right of the pixel belonging to the edge and the value of a sub-pixel located right of a subsequent pixel to the pixel belonging to the edge by a weight $\omega$ and a coefficient $\alpha$, the coefficient being a constant between 0 and 1.

27. The system of claim 25, wherein the signal correction module increases values of the sub-pixels that are respectively located in between and on the right of the pixel belonging to the edge by an amount $\Delta_2$ when the edge is a rising edge that increases in the direction from left to right, wherein the amount $\Delta_2$ being determined based on a result of multiplying a difference between the value of the sub-pixel located left of the pixel belonging to the edge and the value of a sub-pixel located left of a previous pixel to the pixel belonging to the edge by a weight $\omega$ and a coefficient $\alpha$, the coefficient being a constant between 0 and 1.

28. The system of claim 25, wherein if the values of the sub-pixels that are respectively located left of and in between the pixel belonging to the edge and values of the sub-pixels that are respectively located in between and right of the pixel belonging to the edge all need to be increased, the signal correction module compares an amount by which the values of the sub-pixels located respectively left of and in between the pixel belonging to the edge are to be increased when the edge is a falling edge that decreases in the direction from left to right and an amount by which the values of the sub-pixels that are located respectively in between and right of the pixel belonging to the edge are to be increased when the edge is a rising edge that increases in the direction from left to right, and increases whichever of the values of the sub-pixels that are respectively located left of and in between the pixel belonging to the edge and the values of the sub-pixels that are located respectively in between and right of the pixel belonging to the edge correspond to a larger amount than an other.

29. The system of claim 25, wherein the signal correction module varies values of R, G, and B components of the pixel belonging to the edge or values of R, G, and B components of a pixel adjacent to the pixel belonging to the edge so that the brightness of the sub-pixel located right or left of the pixel belonging to the edge can be relatively reduced.

30. The system of claim 17, wherein the period measurement module determines the period of change in pixel values based on a difference between the first value of the pixel belonging to the edge and a third value of at least one previous pixel to the pixel belonging to the edge or a difference between the first value of the pixel belonging to the edge and a fourth value of at least one subsequent pixel to the pixel belonging to the edge.

31. A method of processing an image, the method comprising:

determining a period of change in pixel values based on a first value of a pixel belonging to an edge and a second value of a pixel adjacent to the pixel belonging to the edge in the image; and correcting, by way of a processor, one or more sub-pixels of the pixel belonging to the edge using a weight allocated based on the determined period.

32. A non-transitory computer readable medium comprising computer readable code to control at least one processing element to implement the method of claim 31.

33. A non-transitory computer readable medium comprising computer readable code to control at least one processing element to implement the method of claim 1.

\* \* \* \* \*

UNITED STATES PATENT AND TRADEMARK OFFICE
CERTIFICATE OF CORRECTION

PATENT NO. : 7,983,506 B2
APPLICATION NO. : 11/889623
DATED : July 19, 2011
INVENTOR(S) : Won-hee Choe et al.

It is certified that error appears in the above-identified patent and that said Letters Patent is hereby corrected as shown below:

Column 14, Line 8, In Claim 7, delete "αbeing" and insert -- α being --, therefor.

Column 16, Line 41, In Claim 23, delete "αbeing" and insert -- α being --, therefor.

Signed and Sealed this
Fourteenth Day of February, 2012

David J. Kappos
*Director of the United States Patent and Trademark Office*